(12) United States Patent  
Smith

(10) Patent No.: US 7,088,285 B2
(45) Date of Patent: Aug. 8, 2006

(54) TEST APPARATUS FOR A WAVEGUIDE SENSING LEVEL IN A CONTAINER

(75) Inventor: Lee Michael Smith, Baton Rouge, LA (US)

(73) Assignee: Rosemount Inc., Eden Prairie, MN (US)

( * ) Notice: Subject to any disclaimer, the term of this patent is extended or adjusted under 35 U.S.C. 154(b) by 256 days.

(21) Appl. No.: 10/853,587

(22) Filed: May 25, 2004

(65) Prior Publication Data

US 2005/0264440 A1    Dec. 1, 2005

(51) Int. Cl.
 *G01F 23/284* (2006.01)
(52) U.S. Cl. ............... 342/124; 342/165; 73/290 R
(58) Field of Classification Search ........... 342/124
See application file for complete search history.

(56) References Cited

U.S. PATENT DOCUMENTS

| | | | | |
|---|---|---|---|---|
| 5,609,059 A * | 3/1997 | McEwan | ................ | 73/290 R |
| 5,611,239 A | 3/1997 | Klinshteyn | ................ | 73/290 |
| 6,107,957 A | 8/2000 | Cramer et al. | ............ | 342/124 |
| 6,538,598 B1 * | 3/2003 | Wilkie et al. | ............. | 342/124 |
| 6,539,267 B1 | 3/2003 | Eryurek et al. | ............ | 700/51 |
| 6,588,313 B1 | 7/2003 | Brown et al. | .............. | 92/5 |
| 6,601,005 B1 | 7/2003 | Eryurek et al. | ............ | 702/104 |
| 6,609,427 B1 | 8/2003 | Westfield et al. | ........... | 73/753 |
| 6,612,174 B1 | 9/2003 | Sittler et al. | ................. | 73/705 |
| 6,628,229 B1 | 9/2003 | Johnson et al. | ............ | 342/124 |
| 6,662,649 B1 * | 12/2003 | Knight et al. | ............ | 73/290 V |
| 2002/0084931 A1 * | 7/2002 | Bletz | .................. | 342/124 |
| 2005/0241391 A1 * | 11/2005 | Kull | ..................... | 73/313 |

OTHER PUBLICATIONS

Product Data Sheet 00813-0100-4811, Rev AC, Aug. 2003, Rosemount 3300 Series, "Guided Wave Radar Level and Interface Transmitter" pp. 1-35.
Notification of Transmittal of the International Search Report and the Written Opinion of the International Searching Authority for International Application No. PCT/US2005/013500, filed Apr. 20, 2005 which was mailed Sep. 26, 2005.

* cited by examiner

*Primary Examiner*—Thomas H. Tarcza
*Assistant Examiner*—Matthew Barker
(74) *Attorney, Agent, or Firm*—Westman, Champlin & Kelly

(57) ABSTRACT

A test apparatus for a waveguide that senses levels in a container. The test apparatus includes a bridge with a test position where the bridge bridges the waveguide to simulate a simulated level. The bridge also has a storage position. The test apparatus also has an actuator coupled to the bridge that moves the bridge between the test and storage positions.

26 Claims, 4 Drawing Sheets

TEST APPARATUS FOR A WAVEGUIDE SENSING LEVEL IN A CONTAINER

BACKGROUND OF THE INVENTION

Level transmitters that transmit and receive reflected electromagnetic pulses along a waveguide in a container are known. These level transmitters provide one or more local or remote outputs that indicate a fluid level in the container.

The fluid level in a storage container, and also the transmitter outputs can remain unchanged for long periods of time. An operator may not be able to tell the difference between an unchanging transmitter output that accurately indicates an unchanging fluid level and an unchanging transmitter output that is stuck at a fixed output value because the waveguide or level transmitter is malfunctioning. A localized build-up of contamination on the waveguide, for example, can cause such a malfunction. If a level output is stuck, then fluid can be lost from the container, or the container can be overfilled, without any warning to the operator.

A method and an apparatus are needed to enable an operator to reliably ascertain whether an unchanging level transmitter output is due to an unchanging level or due to a malfunction.

SUMMARY OF THE INVENTION

Disclosed is a test method and test apparatus for a waveguide that senses levels in a container. The test apparatus comprises a bridge. The bridge has a test position in which the bridge bridges the waveguide to simulate a simulated level. The bridge also has a storage position in which the bridge does not bridge the waveguide.

The test apparatus also comprises an actuator coupled to the bridge. The actuator moves the bridge between the test position and the storage position.

Other features and advantages of the invention will be apparent to those skilled in the art upon review of the detailed description and the associated drawings.

DETAILED DESCRIPTION OF THE PREFERRED EMBODIMENTS

In the embodiments described below, a method and apparatus enable an operator to test a level transmitter and waveguide in order to find out if an unchanging transmitter output is due to a transmitter malfunction or due to an actual unchanging level in a container. The operator is able to make the test without any independent measurement of the level in the container and without changing the level in the container.

A test apparatus is provided that includes a bridge that can be bridged across the waveguide. A support is used to move the bridge between a test position where the waveguide is bridged, and a storage position where the waveguide is not bridged. The operator can move the bridge into the test position and observe the transmitter output. If the waveguide is functioning properly, the transmitter output will indicate a simulated level corresponding to the level of the bridge. If the transmitter is not functioning properly, the transmitter output will not indicate the simulated level.

Figure 1:
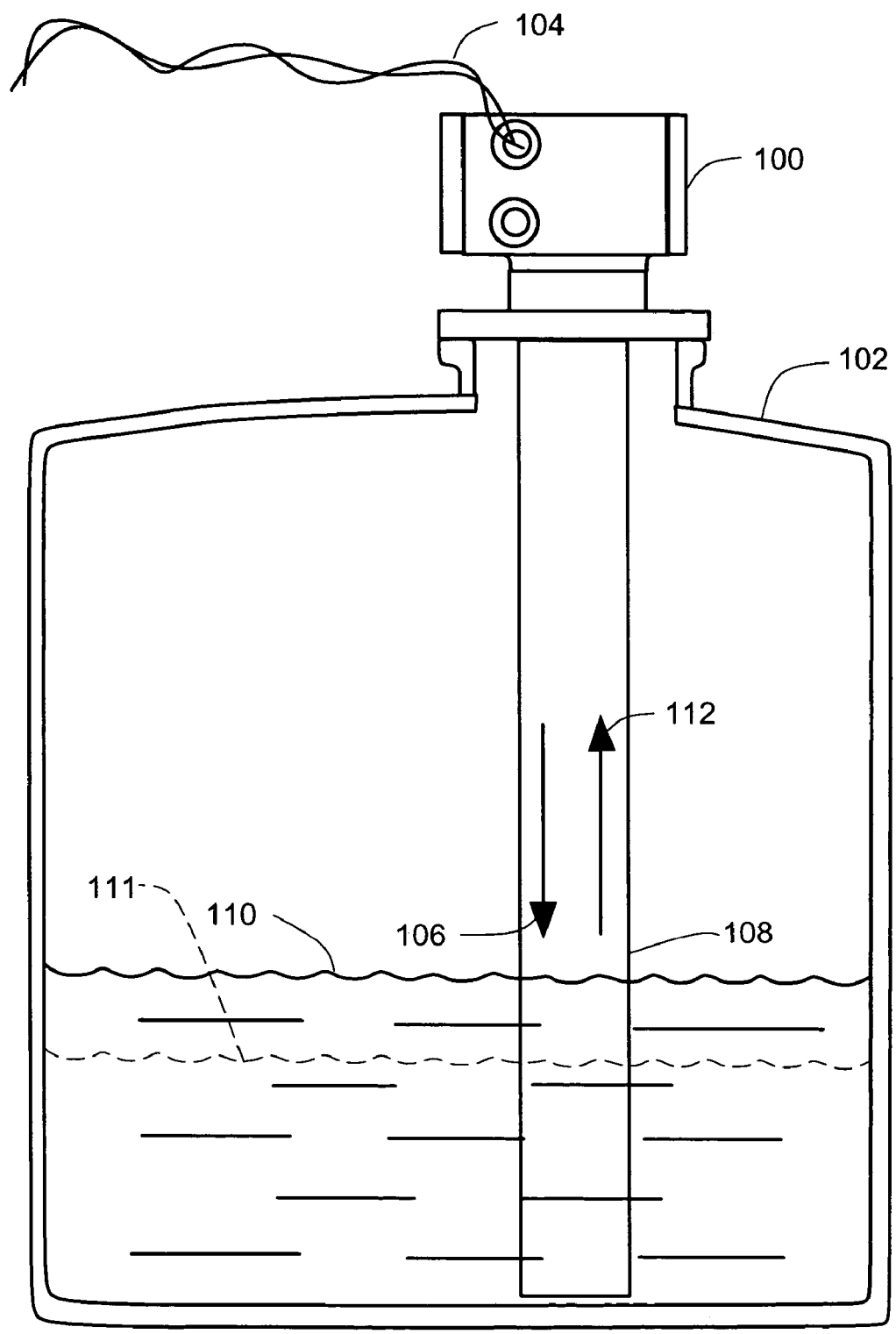
FIG. 1 illustrates an exemplary product level transmitter installed on a storage container.

FIG. 1 illustrates an exemplary product level transmitter 100 installed on an industrial storage container 102. Product level transmitter 100 connects to an industrial process control system (not illustrated) by way of a bus 104. Bus 104 may be a 2-wire, 4–20 mA industrial current loop (also called a telemetry loop) that provides all of the energization for the transmitter 100. Bus 104 can also comprise any known industrial field bus such as Foundation Fieldbus, Profibus, or CAN. Bus 104 may also comprise an optical fiber bus, a wireless communication link, an ethernet network, WORLDFIP network, a CONTROL NET network, a DEVICE BUS network, or any other communication link compatible with the environment of the transmitter 100. Alternatively, product level transmitter can be energized from another source such a solar panel. An example of a product level transmitter circuitry is described below in connection with FIG. 2.

The product level transmitter 100 transmits an electromagnetic pulse 106 along a waveguide 108 to a varying product level such as levels 110 or 111 inside the container 102. The waveguide 108, which is shown only in block diagram form in FIG. 1, can take a variety of forms. The transmitted pulse 106 is reflected off of the product level surface 110 (or 111) and returns to the transmitter 100 as a reflected pulse 112. There is a time delay associated with the travel of the transmitted pulse from the transmitter 100 to the product level 110 and back from the product level 110 to the transmitter 100. The transmitter 100 measures this reflection time delay and, using a known speed of propagation of the electromagnetic pulse along the waveguide 108, calculates the distance between the transmitter 100 and the product level 110.

Using known dimensions of the container or other calibration data, the transmitter calculates the product level (in terms of volume, depth, or mass) of in the storage container and provides an output to the bus 104 that indicates the product level. Transmitter 100 measures the reflection time delay to a high degree of precision and stability, consistent with the needs of an industrial process control system (not illustrated) connected to the bus 104. As explained in more detail below, the transmitter 100 can also provide a second output on bus 104 (in addition to a product level output) indicating that the product level output temporarily represents a simulated level during a test rather than an actual sensed level. This second output provides an advantage in warning an operator that a product level output is a simulated output and also provides a control input to the control system connected to bus 104 so that the control system does not respond to the simulated output as if it were an actual sensed output.

Figure 2:
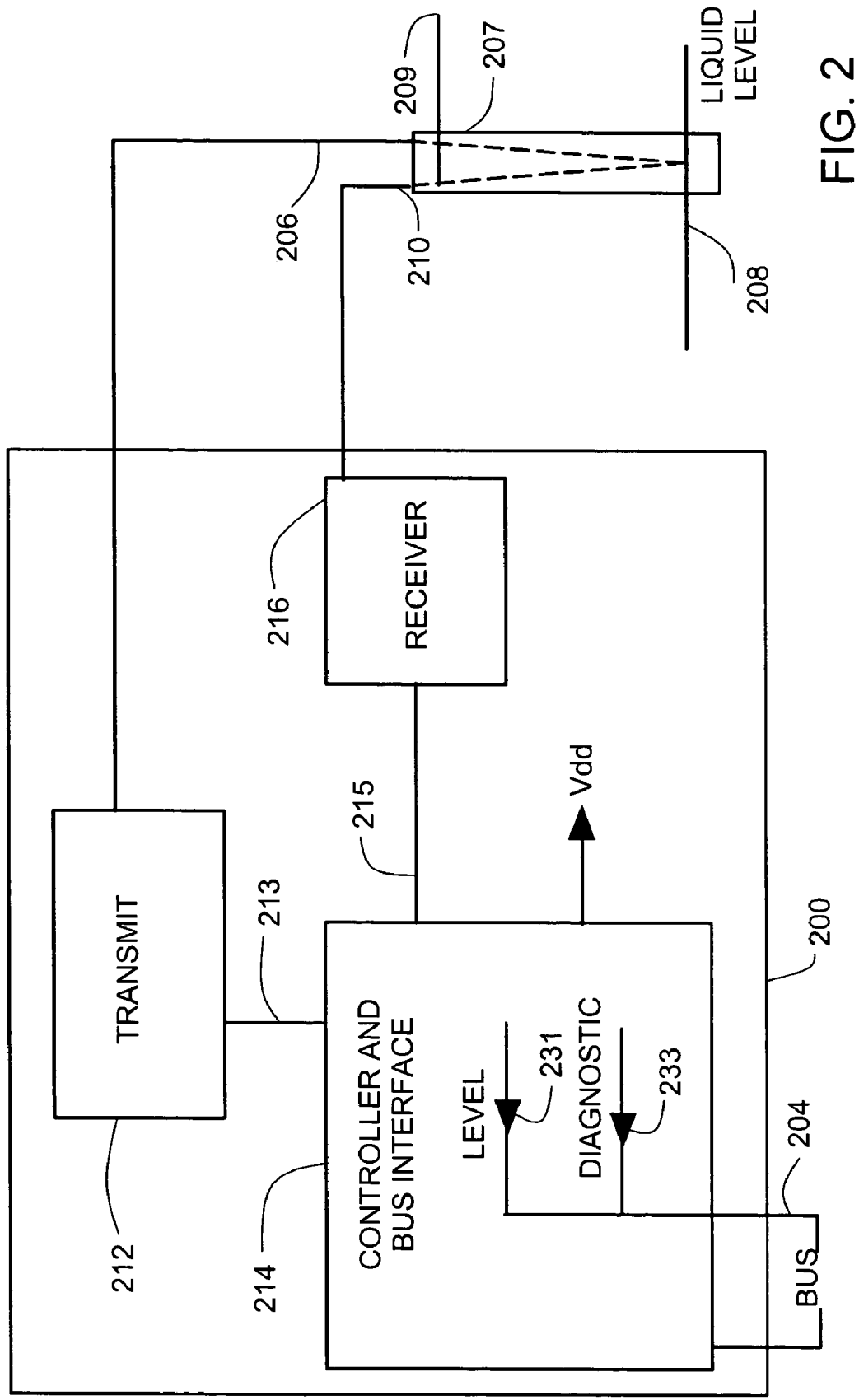
FIG. 2 schematically illustrates a block diagram of a an exemplary circuit of a product level transmitter.

FIG. 2 schematically illustrates an exemplary embodiment of a product level transmitter 200. Product level transmitter 200 includes a controller and bus interface circuit 214 that interfaces with a bus 204. The bus 204 may be a 2 wire, 4–20 mA loop that provides all of the power to the transmitter 200. Alternatively, the controller and bus interface circuit 214 may derive power from a source other than the bus 204. The controller and bus interface circuit 214 provides a power supply voltage Vdd that energizes all of the circuitry in transmitter 200. The transmitter 200 includes a transmit circuit 212 that transmits electromagnetic radiation along line 206 to a waveguide 207. The electromagnetic radiation travels along the waveguide 207 to a product level surface 208 and is reflected back from the product level surface 208 along the waveguide 207 to a line 210 of the transmitter 200.

Transmitter 200 can be connected with any known type of electromagnetic waveguide between the transmitter 200 and the product level surface 208. For example, the waveguide may include any of various known types of transmission lines extending from the radar level transmitter 200 to the product level 208. One or more wires, a coaxial transmission line, a hollow waveguide, rigid twinlead, rigid single lead, flexible twin lead or flexible single lead can be used as the waveguide 207 to transmit electromagnetic radiation back and forth between the transmitter 200 and the product level 208. The use of a waveguide 207 ensures a well-defined path length to the liquid level 208 for measurement and avoids problems with stray reflections from other surfaces that can occur with the use of simple radiating antennas.

The product level transmitter 200 also comprises a receiver 216 coupled to line 210 for receiving the reflected radiation. The controller and bus interface circuit 214 couples on line 213 to the transmit circuit and controls the transmit circuit 212. The controller and bus interface circuit 214 couples on line 215 to the receiver 216. The controller and bus interface circuit 214 processes data received on line 215 and converts the data to a level signal 231 that is transmitted to bus 204.

When the waveguide 207 is bridged by a bridge 209 (as described in more detail below in connection with FIGS. 3–4), a reflection occurs at the bridge 209 that simulates a simulated level reading that is different than an actual level reading. The simulated level reading is typically at an elevation in the container that is higher than actual level readings. This higher elevation provides a simulated level signal quality that is different than the signal qualities of actual level reading.

The impedance of the bridge can also be selected to be different than the impedance of an actual fluid level, thus providing a different amplitude simulated reflected signal. This different amplitude of the reflected signal is also a signal quality that is different than the signal qualities of actual level readings.

In a preferred arrangement, the controller and bus interface circuit 214 is programmed to sense one or more of these signal qualities and provides a second or diagnostic output 233 to the bus 204.

The diagnostic output 233 indicates whether the first or level output on line 231 is an actual level reading or a simulated level. The controller and interface circuit 214 may pass this diagnostic information on to the bus 204 in the form of a digital signal superimposed on the 4–20 mA loop current according to the HART protocol or other known standard signalling protocol. The operator and the control system are warned by the diagnostic information that the simulated level reading is not an actual level reading.

The arrangement shown in FIG. 2 is exemplary. A variety of known radar level systems using waveguides can be used in conjunction with the arrangements described below for testing operation of radar level systems.

Figure 3:
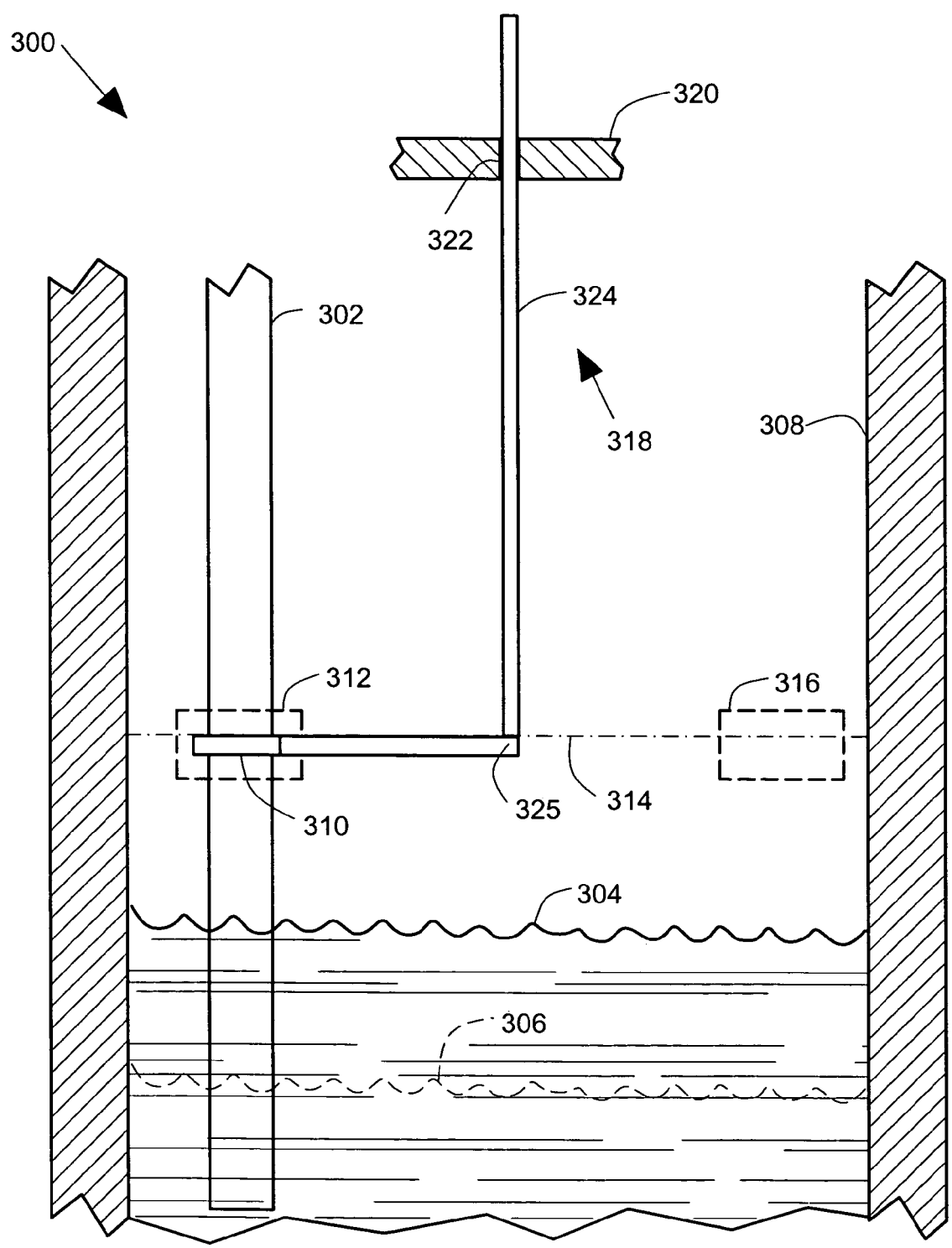
FIG. 3 illustrates a block diagram of a first embodiment of a test apparatus.

FIG. 3 illustrates a block diagram of a first embodiment of a test apparatus 300 for testing a waveguide 302 that senses variable levels such as levels 304, 306 in a container 308. The test apparatus 300 comprises a bridge 310 that has a test position 312 in which the bridge 310 is close to the waveguide 302 and bridges the waveguide 302 to simulate a simulated level 314. The simulated level 314 is preferably higher than the highest of the sensed levels 304, 306. The bridge 310 also has a storage position 316 that is remote from the waveguide 302 in which the bridge 310 does not bridge the waveguide 302. The waveguide 302 preferably comprises a pair of generally parallel conductors. The bridge 310 preferably comprises a bar that bridges the parallel conductors in the test position 312.

The term "bridge" as used in the application means providing an electromagnetic discontinuity at a simulated level along the waveguide that reflects a simulated level signal back along the waveguide to a transmitter above the waveguide. The simulated level signal need only be of sufficient magnitude to be detectable by the transmitter and can have one or more level signal qualities that differ from an actual sensed level signal. The shape and/or structure of the bridge can vary depending on the shape of the waveguide. Bridging can take place when the bridge is sufficiently close to the waveguide to cause a reflection, and the bridge can effectively bridge the waveguide even when it does not physically contact waveguide conductors.

The test apparatus 300 also includes an actuator 318 for engaging and disengaging the bridge with the waveguide. In one embodiment, the actuator 318 includes a support 320 that includes a bearing 322 and a member 324 that is movably mounted to the bearing 322. In one preferred arrangement, the bearing 322 comprises a sleeve bearing, and is preferably made of the material that is the same as the material used to enclose the container. In another preferred arrangement, the bearing 322 comprises a metal block having a hole, and the member 324 comprises a metal shaft that passes through the hole. As illustrated, the metal shaft has a lengthwise axis that is vertical, and the metal shaft is slidably movable in the block to provide a range of different simulated levels. The member 324 can alternatively be restrained from sliding to provide a fixed simulated level. The block can comprise a portion of the container or be a separate part.

In this embodiment, the member 324 mechanically couples or attaches to the bridge 310 at a coupling point 325. The member 324 is actuatable to move the bridge 310 between the test position 312 and the storage position 316. The bearing 322 is preferably arranged to electrically ground the member 324 and the bridge 310 to avoid buildup of static charge in areas where flammable vapors may be present. Grounding of the bridge 310 can, in some applications, enhance the effectiveness of the bridging, particularly when waveguide 302 comprises a single lead conductor. The bearing 322, the member 324 and the bridge 310 are preferably made of non-sparking materials for use in areas where flammable vapors may be present.

It will be understood by those skilled in the art that the container 308 can comprise a tank or can alternatively comprise a standpipe or stilling pipe alongside a larger tank. It will further be understood by those skilled in the art that the container 208 can be a narrow stilling well that also functions as an outer conductor part of a waveguide system in conjunction with the waveguide 302.

In this embodiment, an operator can use the actuator 318 to actuate the member 324 to move the bridge 310 into the test position 312 and then read a level output of the transmitter. If the level output indicates the simulated level 314, then the operator can conclude that the waveguide (and also the transmitter) are working properly and that the transmitter output is not stuck. On the other hand, if the bridge 310 is moved into the test position 312 and the transmitter output continues to provide a normal level reading, then the operator can conclude that troubleshooting of the level system is needed. Once the operator is able to conclude that the waveguide is working properly, the bridge 310 can be moved back to the storage position 316, and the operator can rely on the level reading as correct.

Figure 4:
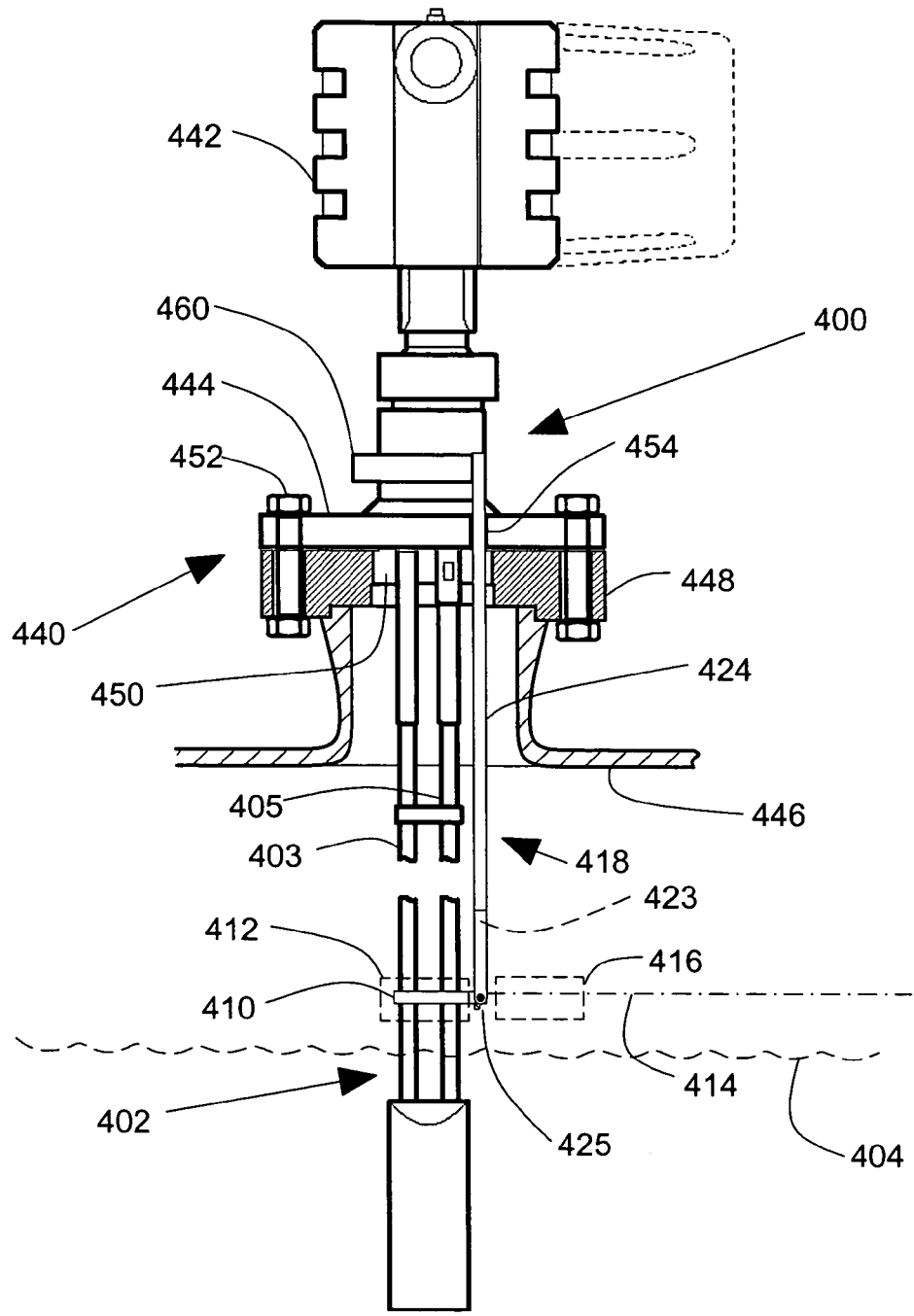
FIG. 4 pictorially illustrates a second embodiment of a test apparatus.

FIG. 4 pictorially illustrates a second embodiment of an illustrative test apparatus 400 for testing a waveguide 402 that senses variable levels such as level 404 in a container. A level transmitter 440 includes a transmitter electronics housing 442 and a transmitter mounting flange 444. The waveguide 402 passes through the transmitter mounting flange 444 and connects to the level transmitter 440.

A container 446 includes a container flange 448 that includes a flange opening 450 that provides access inside the container 446 for installing the waveguide 402 and the test apparatus 400. The transmitter mounting flange 444 is bolted to the container flange 448 by bolts 452. The transmitter mounting flange 444 also includes a round through hole 454 that is off center, but is aligned with the flange opening 450.

The test apparatus 400 comprises a bridge 410 that is shown in a test position 412 in which the bridge 410 is close to the waveguide 402 and bridges the waveguide 402 to simulate a simulated level 414. The simulated level 414 is preferably higher than the highest sensed levels 404. The bridge 410 also has a storage position 416 that is remote from the waveguide 402 in which the bridge 410 does not bridge the waveguide 402.

In this embodiment, the waveguide 402 comprises a pair of generally parallel conductors 403, 405. The bridge 410 preferably comprises a metal bar that bridges the parallel conductors 403, 405 to one another in the test position 312. The bridge 410 is attached to a shaft member 424. The shaft member 424 rotates in the round through hole 454 which serves as a bearing.

The bridge 410 has a mounting point 425 where it is mounted to the shaft member 424. The mounting point 425 preferably includes a hinge so that the bridge 410 can be rotated upwardly to a position inside a slot 423 in the shaft member 424 to allow the test apparatus 400 to slide in through hole 454 in order be retrofitted to the transmitter installation after the level transmitter 440 is already installed, and without removing the transmitter 440 from the installation. Once inside the container, gravity causes the bridge 410 to drop down into the position shown in FIG. 4.

A handle 460 is attached to the shaft member 424 for manually rotating the shaft member 424. The handle 460 also serves as an indicator of the position of the bridge 410. The handle 460 preferably points in the same horizontal direction as the bridge 410 so that position of the bridge 410 is self-evident to a skilled operator. Markings can also be placed on the upper surface of transmitter flange 444 to better indicate the test position and storage position of the handle 460.

It is appreciated that the actuator 418 may be provided with a remote actuation mechanism so that a user can actuate the actuator 418 remotely. In this way, for example, a user could send a signal electronically to place the actuator 418 in the test position 412, read the test signal, and then send a signal disengaging the actuator 418 back to the storage position 416.

It will be understood by those skilled in the art that features shown in one test apparatus embodiment can be appropriately applied to a test apparatus that is similar to or identical to another test apparatus embodiment described above. Depending on the needs of a particular installation environment, the support can be arranged to permit actuation that is rotary, sliding or a combination of rotary and sliding. The support can also be arranged as a gimbal mounting (ball and socket feedthrough), which can provide gimbal motion or a combination of gimbal and sliding motion.

A mechanical lock or detent can be included to hold or lock the test apparatus in a storage position when it is not in use. In the case of coaxial waveguide systems, a hole can be provided in an outer conductor of the waveguide system to permit the bridge to enter the waveguide and bridge from the outer conductor to a center conductor of the coaxial waveguide system. The support can be sealed in applications where sealing of the container is desired. The actuating member can be arranged horizontally or at an angle in installations where vertical mounting is impractical. The actuating member can also be arranged to actuated by a motor which can be remotely controlled. A spring can also be provided to spring load the actuating member to the storage position in order to avoid inadvertently leaving the test apparatus in the test position.

Although the present invention has been described with reference to preferred embodiments, workers skilled in the art will recognize that changes may be made in form and detail without departing from the spirit and scope of the invention.

What is claimed is:

1. A test apparatus for a waveguide that senses level in a container, the test apparatus comprising:
    a bridge having a test position in which the bridge bridges the waveguide to simulate a simulated level, and having a storage position in which the bridge does not bridge the waveguide; and
    an actuator coupled to the bridge to move the bridge between the test position and the storage position.

2. The test apparatus of claim 1 wherein the actuator includes a member coupled to the bridge.

3. The test apparatus of claim 2 wherein the actuator includes a bearing in which the member is movably mounted.

4. The test apparatus of claim 1 wherein the waveguide comprises a pair of generally parallel conductors and the bridge comprises a bar that bridges the conductors in the test position.

5. The test apparatus of claim 1 further comprising a handle coupled to the member to provide manual actuation.

6. The test apparatus of claim 1 wherein the actuator is remotely actuated to move between the test and storage positions.

7. The test apparatus of claim 1 further comprising an indicator positioned outside the container and indicating actuation to the test position.

8. The test apparatus of claim 1 wherein the simulated level is higher than the sensed levels.

9. The test apparatus of claim 1 wherein the bearing comprises a sleeve bearing.

10. The test apparatus of claim 1 wherein the bearing comprises a block having a hole, and the member comprises a shaft that passes through the hole.

11. The test apparatus of claim 10 wherein the shaft has a lengthwise axis that is vertical.

12. The test apparatus of claim 10 wherein the shaft is slidably movable in the block.

13. The test apparatus of claim 10 wherein the block comprises a portion of the container.

14. The test apparatus of claim 10 wherein the block comprises a level transmitter flange.

15. The test apparatus of claim 1, further comprising:
    a level transmitter coupled to the waveguide and providing a level output.

16. The test apparatus of claim 15 wherein the simulated level comprises a first level signal quality that is different that level signal qualities of the levels sensed in the container, and the level transmitter senses the first level signal quality and provides a diagnostic output indicating whether the level output is simulated or sensed.

17. A test apparatus for a waveguide that senses levels in a container, the test apparatus comprising:
   a bridge having a test position in which the bridge bridges the waveguide to simulate a simulated level, and having a storage position in which the bridge does not bridge the waveguide;
   support means supporting the bridge; and
   actuation means actuating the bridge to move between the test position and the storage position.

18. The test apparatus of claim 17 wherein the simulated level is higher than the sensed levels.

19. The test apparatus of claim 17 wherein the support means comprise a block having a hole, and the member comprises a shaft that passes through the hole.

20. The test apparatus of claim 19 wherein the shaft is slidably movable in the block.

21. The test apparatus of claim 17, further comprising:
   a level transmitter coupled to the waveguide and providing a level output; and
   the simulated level comprising a first level signal quality that is different that level signal qualities of the levels sensed in the container, and the level transmitter senses the first level signal quality and provides a diagnostic output indicating whether the level output is simulated or sensed.

22. A method for testing a waveguide that senses levels in a container, the method comprising:
   providing a bridge that is movable between a test position in which the bridge bridges the waveguide to simulate a simulated level, and a storage position in which the bridge does not bridge the waveguide; and
   actuating a member move the bridge between the test position and the storage position.

23. The method of claim 22, further comprising:
   supporting the bridge with a bearing and a member that is movably mounted to the bearing.

24. The method of claim 22 further comprising:
   providing a manual actuator for actuating the member.

25. The method of claim 22 further comprising:
   providing remote actuation for actuating the member.

26. The method of claim 22 further comprising:
   positioning an indicator outside the container to indicate actuation to the test position.

* * * * *